United States Patent
Chen et al.

(10) Patent No.: US 11,829,549 B2
(45) Date of Patent: Nov. 28, 2023

(54) METHOD OF CONTROLLING STYLUS PEN OF TOUCH PANEL

(71) Applicant: NOVATEK Microelectronics Corp., Hsin-Chu (TW)

(72) Inventors: Hung-Hsiang Chen, Hsinchu (TW); Wei-Kai Chen, Hsinchu County (TW); Huang-Chin Tang, Hsinchu County (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 0 days.

(21) Appl. No.: 17/824,884

(22) Filed: May 25, 2022

(65) Prior Publication Data

US 2023/0074418 A1    Mar. 9, 2023

Related U.S. Application Data

(60) Provisional application No. 63/241,001, filed on Sep. 6, 2021.

(51) Int. Cl.
| | |
|---|---|
| *G09G 5/00* | (2006.01) |
| *G06F 3/041* | (2006.01) |
| *G06F 3/0354* | (2013.01) |
| *G09G 3/36* | (2006.01) |

(52) U.S. Cl.
CPC ...... *G06F 3/04162* (2019.05); *G06F 3/03545* (2013.01); *G06F 3/0412* (2013.01); *G09G 3/3648* (2013.01); *G09G 2320/0233* (2013.01)

(58) Field of Classification Search
CPC ............ G06F 3/04162; G06F 3/03545; G06F 3/0412; G09G 3/3648; G09G 2320/0233
USPC ........................................ 345/173
See application file for complete search history.

(56) References Cited

U.S. PATENT DOCUMENTS

| | | | | |
|---|---|---|---|---|
| 2017/0285771 | A1* | 10/2017 | Jung | ...................... G06F 3/0442 |
| 2019/0171320 | A1* | 6/2019 | Kim | ...................... G06F 3/0443 |
| 2020/0026406 | A1* | 1/2020 | Choi | ................... G06F 3/04184 |
| 2021/0124473 | A1* | 4/2021 | Kim | ...................... G06F 3/0412 |
| 2021/0200356 | A1* | 7/2021 | Chung | .............. G06F 3/041661 |
| 2022/0083193 | A1* | 3/2022 | Kang | ...................... G09G 3/006 |

FOREIGN PATENT DOCUMENTS

| | | |
|---|---|---|
| CN | 103123777 A | 5/2013 |
| TW | 202127212 A | 7/2021 |

* cited by examiner

*Primary Examiner* — Jennifer T Nguyen
(74) *Attorney, Agent, or Firm* — Winston Hsu

(57) ABSTRACT

A method of controlling a stylus pen of a touch panel includes steps of: outputting an uplink control signal to a sensing electrode of the touch panel for controlling the stylus pen in an uplink control period; and outputting a direct-current (DC) voltage to a gate line of the touch panel in the uplink control period.

2 Claims, 17 Drawing Sheets

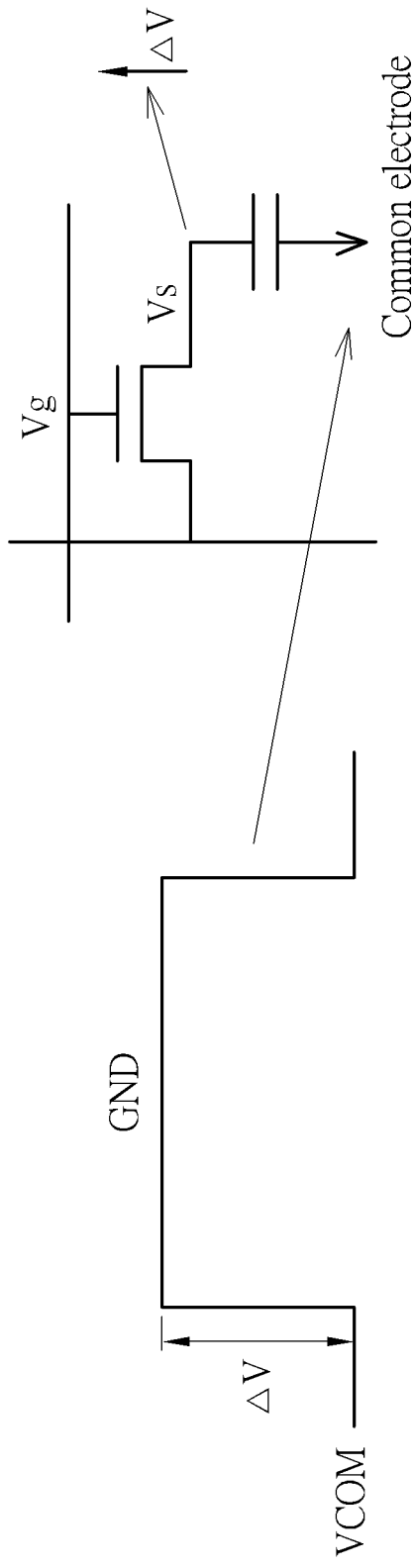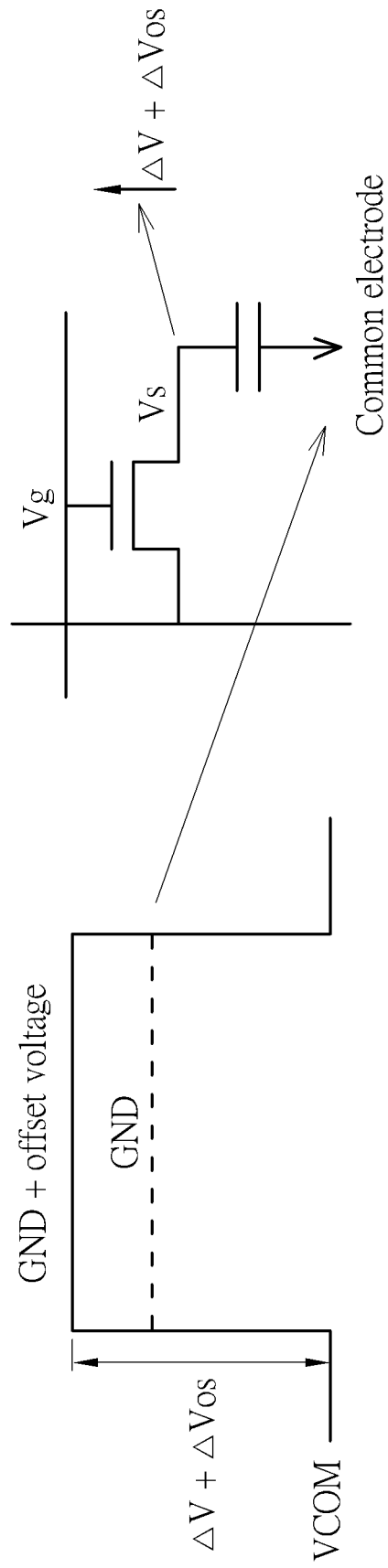
FIG. 12A
FIG. 12B

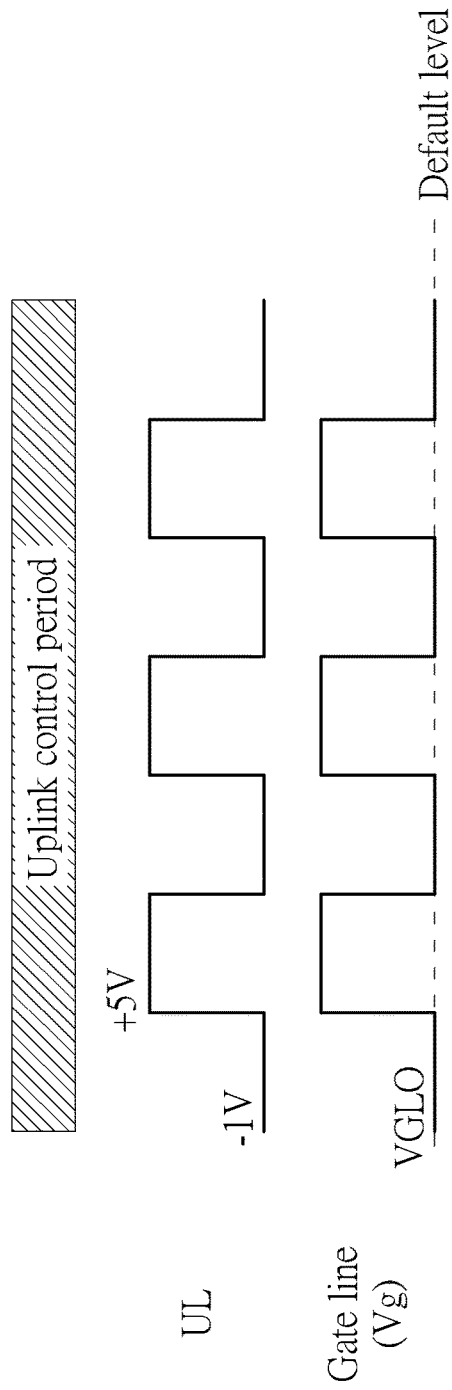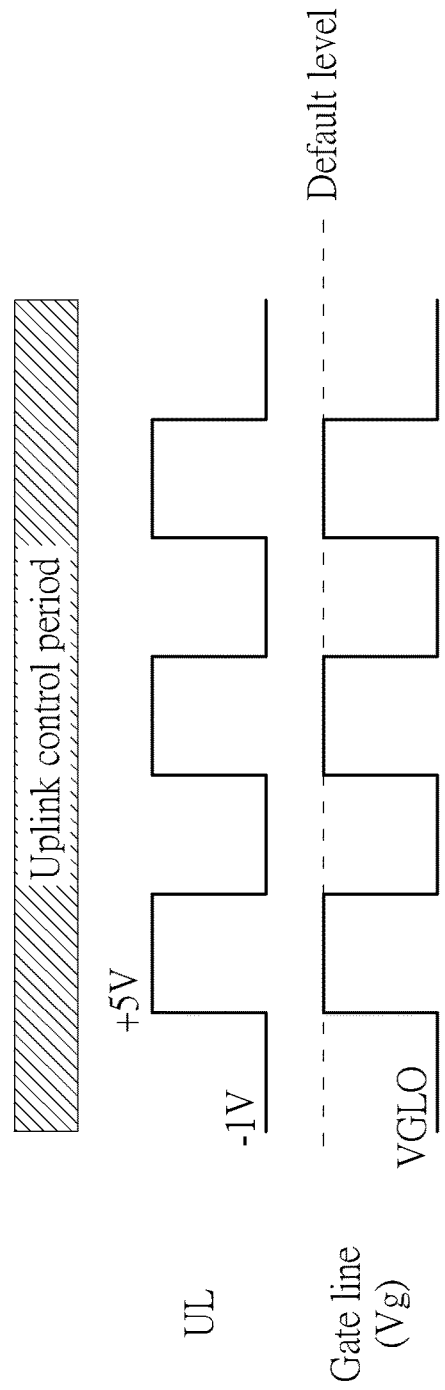
FIG. 14A
FIG. 14B

METHOD OF CONTROLLING STYLUS PEN OF TOUCH PANEL

CROSS REFERENCE TO RELATED APPLICATIONS

This application claims the benefit of U.S. Provisional Application No. 63/241,001, filed on Sep. 6, 2021. The content of the application is incorporated herein by reference.

BACKGROUND OF THE INVENTION

1. Field of the Invention

The present invention relates to a method of controlling a stylus pen of a touch panel, and more particularly, to a method of controlling a stylus pen of a touch panel during an uplink control period in which an uplink control signal is output.

2. Description of the Prior Art

An active stylus pen is a common peripheral device for an electronic device having a touch panel, such as a mobile phone or laptop. In general, the touch panel includes multiple sensing electrodes, which may be integrated in or implemented on the touch panel and configured with finger touch sensing and stylus sensing functions.

Modern active stylus pens are capable of bi-directional communications. The touch panel may output an uplink control signal to the active stylus pen, where the uplink control signal is used to control the operation mode of the active stylus pen and/or perform frequency setting for the active stylus pen. The active stylus pen may send a downlink signal to at least one sensing electrode based on its position, so as to return the position information of the active stylus pen to the control circuit of the touch panel.

In general, in order to improve the performance of uplink control, the pen case of the active stylus pen may be coupled to the ground level. Since the touch panel is commonly used in a large-scale display device, when a user uses the active stylus pen to draw or write on the touch panel, another palm, other fingers or a body portion of the user may contact the touch panel simultaneously, as shown in FIG. 1. In such a situation, the uplink control signal output by the touch panel may be coupled to the pen case through the contacting part of the user. The coupling of the uplink control signal to the pen case may reduce the accuracy and performance of the uplink control. That is, the signal coupled to the pen case will cancel out several energies of the uplink control signal received by the active stylus pen, thereby causing that the active stylus pen may be disconnected from the touch panel during operations.

In order to solve this problem, the uplink control signal may be sent to only partial sensing electrodes. FIG. 2 is a schematic diagram of a pixel array of the touch panel where an exemplary implementation of the uplink control signal is illustrated. As shown in FIG. 2, the panel is a liquid crystal display (LCD) panel where each pixel includes a liquid crystal (LC) capacitor and/or a storage capacitor driven by a driving transistor such as a thin-film transistor (TFT). Each driving transistor is controlled by a gate driver through the respective gate line, to receive display data through the respective data line. The capacitor is further coupled to a common electrode, which may serve as a sensing electrode for finger and stylus touch sensing. As shown in FIG. 2, the uplink control signal UL is merely sent to several columns of sensing electrodes, and several columns of sensing electrodes receive a ground voltage GND.

The approach of sending the uplink control signal UL to partial sensing electrodes and coupling other sensing electrodes to ground reduces the coupling effect on the pen case, so as to improve the transmission efficiency of the uplink control signal UL. However, a visual effect problem may arise, where the region of sensing electrodes forwarding the uplink control signal UL and the region of sensing electrodes coupled to ground appear to have different brightness, as shown in FIG. 3. In general, the display function is expected to be off in the uplink control period. However, abnormal illumination may appear in the regions where the sensing electrodes are coupled to ground and receive the ground voltage GND, thereby causing a brightness difference between different regions on the panel.

Thus, there is a need for improvement over the prior art.

SUMMARY OF THE INVENTION

It is therefore an objective of the present invention to provide a novel method of controlling the active stylus pen and the touch panel, to solve the abovementioned problems.

An embodiment of the present invention discloses a method of controlling a stylus pen of a touch panel. The method comprises steps of: outputting an uplink control signal to a sensing electrode of the touch panel for controlling the stylus pen in an uplink control period; and outputting a direct-current (DC) voltage to a gate line of the touch panel in the uplink control period.

Another embodiment of the present invention discloses a method of controlling a stylus pen of a touch panel. The method comprises a step of: outputting an uplink control signal to a sensing electrode of the touch panel for controlling the stylus pen. Wherein, the uplink control signal starts from a downward pulse having a decreased voltage.

Another embodiment of the present invention discloses a method of controlling a stylus pen of a touch panel. The method comprises steps of: outputting an uplink control signal to a first sensing electrode of the touch panel for controlling the stylus pen in an uplink control period; and outputting a first voltage to a second sensing electrode of the touch panel in the uplink control period. Wherein, the first voltage is greater than a ground voltage.

Another embodiment of the present invention discloses a method of controlling a stylus pen of a touch panel. The touch panel is configured with a gate low voltage having a default level for turning off a driving transistor of the touch panel in a display period or a sensing period. The method comprises steps of: outputting an uplink control signal to a sensing electrode of the touch panel for controlling the stylus pen in an uplink control period; and configuring the gate low voltage to a first level in the uplink control period, wherein the first level is lower than the default level.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 12A is a schematic diagram of a pixel where the sensing electrode is pulled to the ground voltage.

FIG. 12B is a schematic diagram of a pixel where the sensing electrode receives a voltage greater than the ground voltage according to an embodiment of the present invention.

FIG. 14A is a waveform diagram of an uplink control signal and the voltage coupled or applied to the gate line.

FIG. 14B is a waveform diagram of an uplink control signal and the voltage coupled or applied to the gate line according to an embodiment of the present invention.

DETAILED DESCRIPTION

Figure 4:
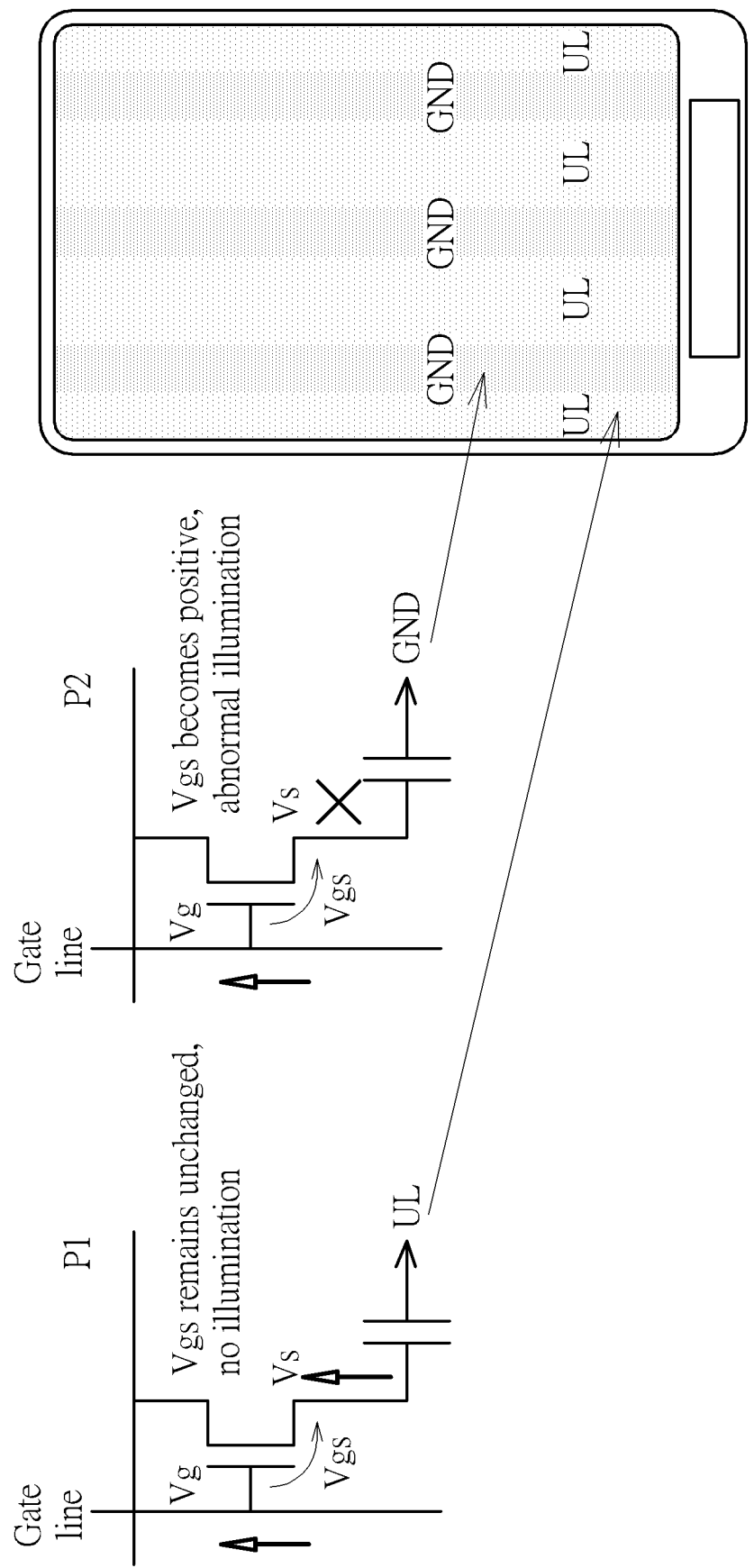
FIG. 4 illustrates the root cause of abnormal display appearing in the period where the uplink control signal is transmitted.

FIG. 4 illustrates the root cause of abnormal display appearing in the period where the uplink control signal is transmitted. As shown in FIG. 4, there may be a first pixel P1 where an uplink control signal UL is applied to the corresponding sensing electrode and a second pixel P2 where the capacitor is coupled to ground (GND). Each of the first pixel P1 and the second pixel P2 includes a driving transistor and at least one capacitor, which may include a liquid crystal capacitor and/or a storage capacitor.

When the uplink control signal UL is applied to the sensing electrode in an uplink control period, the uplink control signal UL may be coupled to the gate lines through parasitic capacitors on the touch panel. As for the first pixel P1, the uplink control signal UL is coupled to the source terminal of the driving transistor through the internal capacitor of the pixel, while the same uplink control signal UL is also coupled to the corresponding gate line; hence, the gate voltage Vg and the source voltage Vs of the driving transistor swing with the same frequency and phase, such that the gate-to-source voltage Vgs of the driving transistor may remain unchanged. In such a situation, the driving transistor of the first pixel P1 may not be turned on to cause abnormal illumination in the uplink control period.

As for the second pixel P2, the corresponding sensing electrode is coupled to the ground terminal, and thus the source voltage Vs of the driving transistor remains unchanged. Simultaneously, the gate voltage Vg of the driving transistor rises since the uplink control signal UL is coupled to the corresponding gate line. In such a situation, the gate-to-source voltage Vgs of the driving transistor may rise and tend to become positive, which may probably turn on the driving transistor to illuminate abnormally in the uplink control period. As shown in FIG. 4, the abnormal illumination may appear in the region where the sensing electrodes are pulled to ground.

In order to avoid the abnormal illumination, the present invention may control the voltage for the gate lines and/or the voltage and signal to be output to the sensing electrodes, in order to reduce the possibility of wrongly turning on the driving transistor in the uplink control period.

Figure 5:
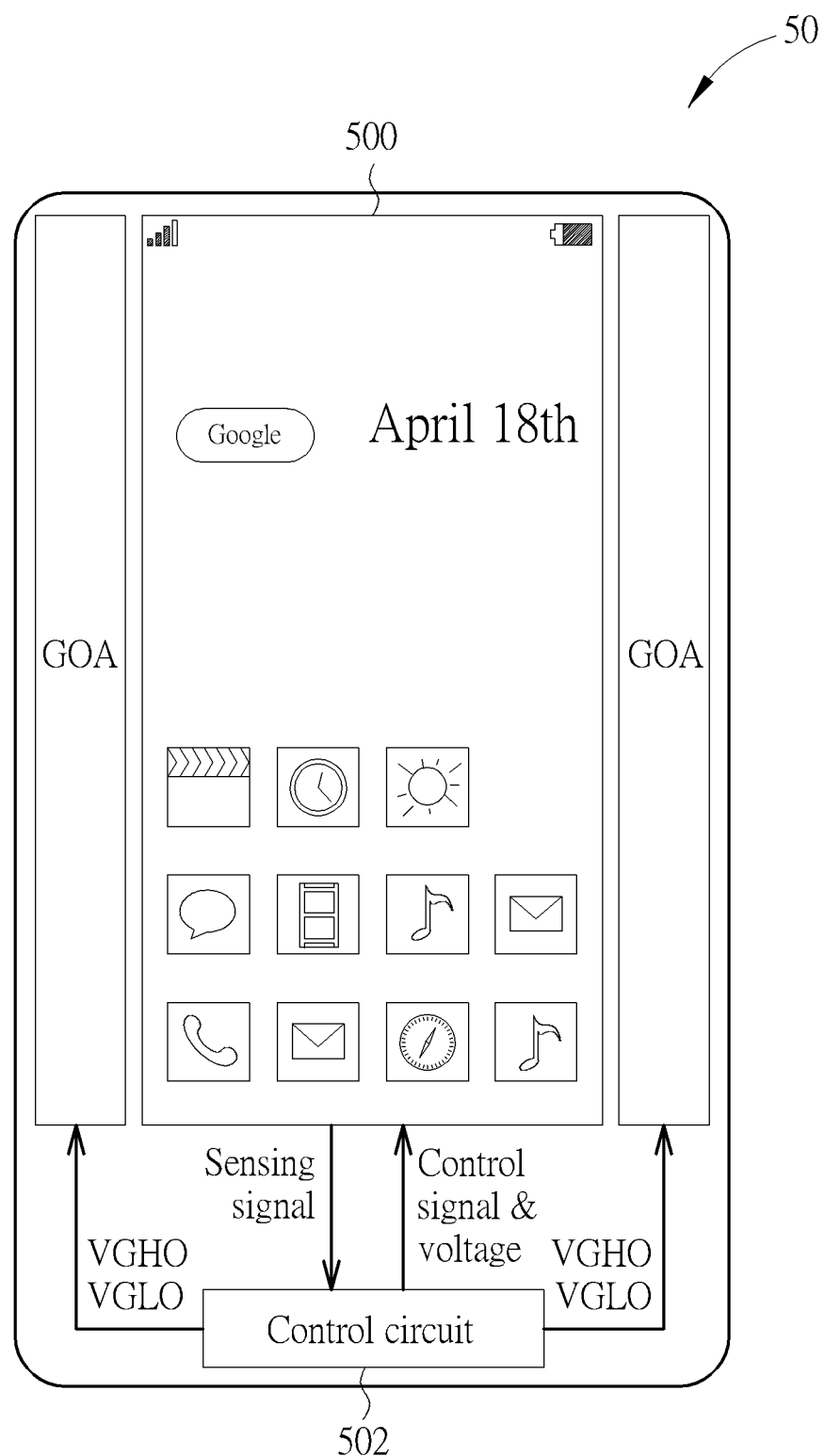
FIG. 5 is a schematic diagram of a display device according to an embodiment of the present invention.

FIG. 5 is a schematic diagram of a display device 50 according to an embodiment of the present invention. The display device 50 includes a touch panel 500 and a control circuit 502. The touch panel 500 has one or more gate-on-array (GOA) circuits deployed in the non-active region, and includes a plurality of sensing electrodes for performing touch sensing and stylus sensing. The control circuit 502 may be an independent touch sensing chip or integrated with display functions as a touch and display driver integrated circuit (TDDI IC). As shown in FIG. 5, the display device 50 may be a mobile phone, but the implementation is not limited thereto. For example, in another embodiment, the display device may be a laptop, touch pad, signature board, or any other device having a touch panel integrated with display and touch functions.

The GOA circuits are coupled to the gate lines of the touch panel 500 and configured to output gate control signals to the touch panel 500. The gate control signals to be output to the gate lines are configured to be switched between two voltage levels, e.g., a high level and a low level. Since the driving transistors in the pixels of the touch panel are NMOS transistors, the high level may be used to turn on the driving transistors and the low level may be used to turn off the driving transistors. In the GOA circuits, the high level of the gate control signals is generated from a gate high voltage VGHO, and the low level of the gate control signals is generated from a gate low voltage VGLO, where the gate high voltage VGHO and the gate low voltage VGLO are provided from the control circuit 502. For example, the control circuit 502 may determine the values of the gate high voltage VGHO and the gate low voltage VGLO, and output these voltages to the GOA circuits through voltage regulators. In general, the control circuit 502 may further provide a gate clock signal and a start pulse signal for the GOA circuits to realize the scan operations on the touch panel in the display period, and these signals are omitted in FIG. 5 without affecting the illustrations of the present embodiment.

In addition, the control circuit 502 may output a control signal and/or voltage to the sensing electrodes on the touch panel, and correspondingly receive sensing signals from the sensing electrodes. On the touch panel 500, the common electrodes of several pixels are coupled together to serve as a sensing electrode, and the sensing electrodes of the touch panel 500 are used to realize the touch sensing operations. In this embodiment, the touch panel 500 supports the finger touch sensing and stylus sensing functions, and thus the control circuit 502 should output uplink control signals to an active stylus pen (hereinafter called active pen), e.g., through the sensing electrodes, in order to realize the stylus sensing.

Figure 6:
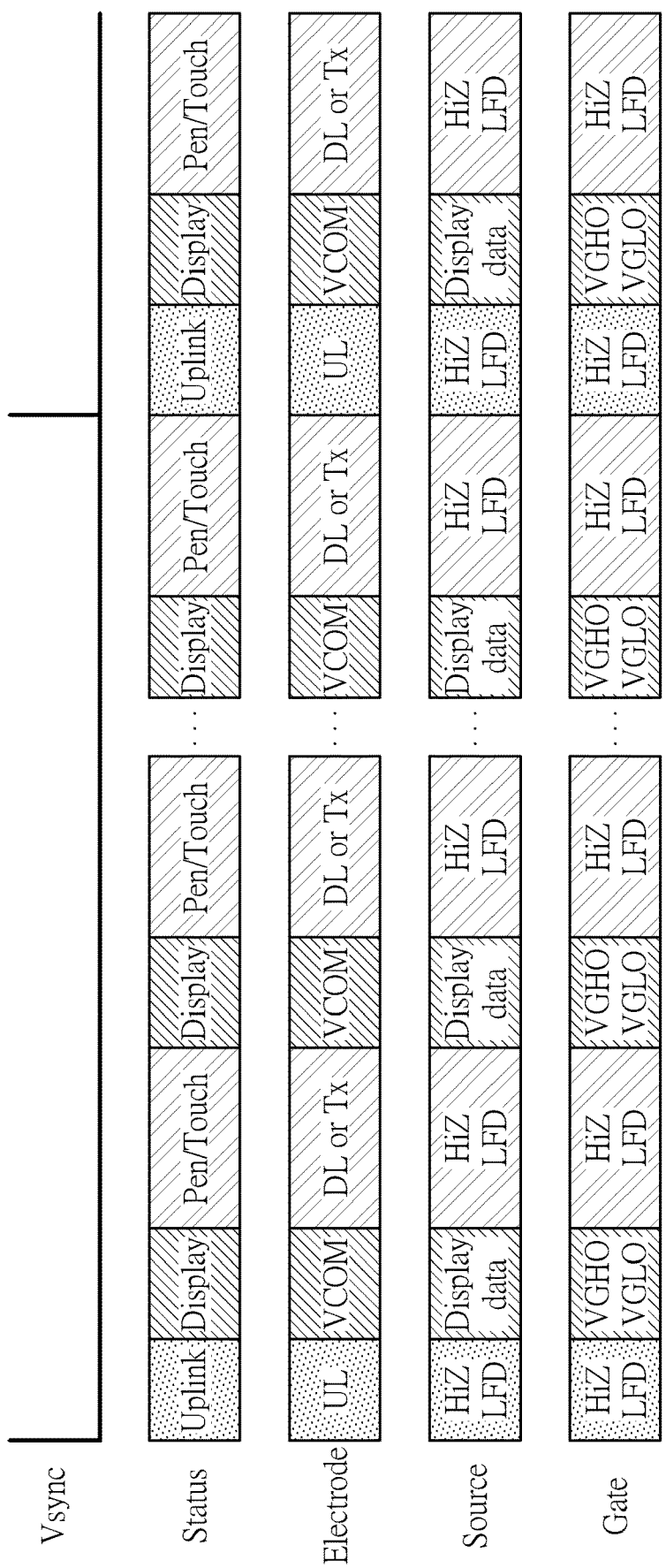
FIG. 6 is a timing diagram of controlling the active pen.

FIG. 6 is a timing diagram of controlling the active pen. As shown in FIG. 6, the operations have three statuses (or periods): pen control, display, and pen/touch sensing. In this embodiment, a frame period defined by the vertical synchronization signal Vsync starts with an uplink control period, which is followed by alternate display periods and pen/touch sensing periods. In the uplink control period, the control circuit 502 may output an uplink control signal UL to the sensing electrodes, and the uplink control signal UL is forwarded to an active pen if the active pen approaches or touches the touch panel 500. The uplink control signal UL is used to provide a command for the active pen and/or control the operation mode of the active pen. In the display period, the control circuit 502 may output a common voltage VCOM to the sensing electrodes. Note that the sensing electrodes are the common electrodes of the pixels. Therefore, the display data voltages relative to the common voltage VCOM may drive the liquid crystal capacitors in the pixels to realize the display operations, where the detailed operations are well known by a skilled person and will not be narrated herein. In the pen/touch sensing period, the control circuit 502 performs active pen sensing by receiving downlink sensing signals DL from the sensing electrodes, and/or performs touch sensing by outputting a touch sensing signal Tx to the sensing electrodes. The downlink sensing signals DL may be received from an active pen, and the touch sensing signal Tx may be generated from a touch control circuit.

In general, during the uplink control period and the pen/touch sensing period, the source lines and the gate lines are configured to be floating (i.e., high impedance, abbreviated as HiZ) or applied with a load-free driving (LFD) signal. The LFD signal is a signal of which the frequency, phase and/or amplitude is substantially identical to the frequency, phase and/or amplitude of the touch driving signal. The LFD signal and floating control may prevent or reduce capacitive loads of the touch sensing operations. Specifically, the sensing electrodes are toggled with the uplink control signal UL or the downlink sensing signal DL or the touch sensing signal Tx, which may be a series of continuous square signals or sinusoidal signals. In order to prevent or reduce the capacitive loads generated from the parasitic capacitors between the sensing lines, gate lines and data lines, it is preferable to apply the LFD signal to the gate lines and data lines and/or configure the gate lines and data lines to be floating.

In the display period, the GOA circuits may output the gate control signals to the gate lines, where the gate control signals are switched between the gate high voltage VGHO and the gate low voltage VGLO. The control circuit 502 may correspondingly output display data to the source lines (or called data lines) of the touch panel 500, and each display data is received by a corresponding pixel based on the control of the gate control signals.

Note that the allocation of the periods for different statues as shown in FIG. 6 is one of various implementations of the present invention. In another embodiment, the period allocations and related operations may be performed in other manner. For example, there may be multiple uplink control periods where the uplink control signal UL is transmitted in a frame period, or only one uplink control period is allocated in multiple consecutive frame periods.

Figure 7:
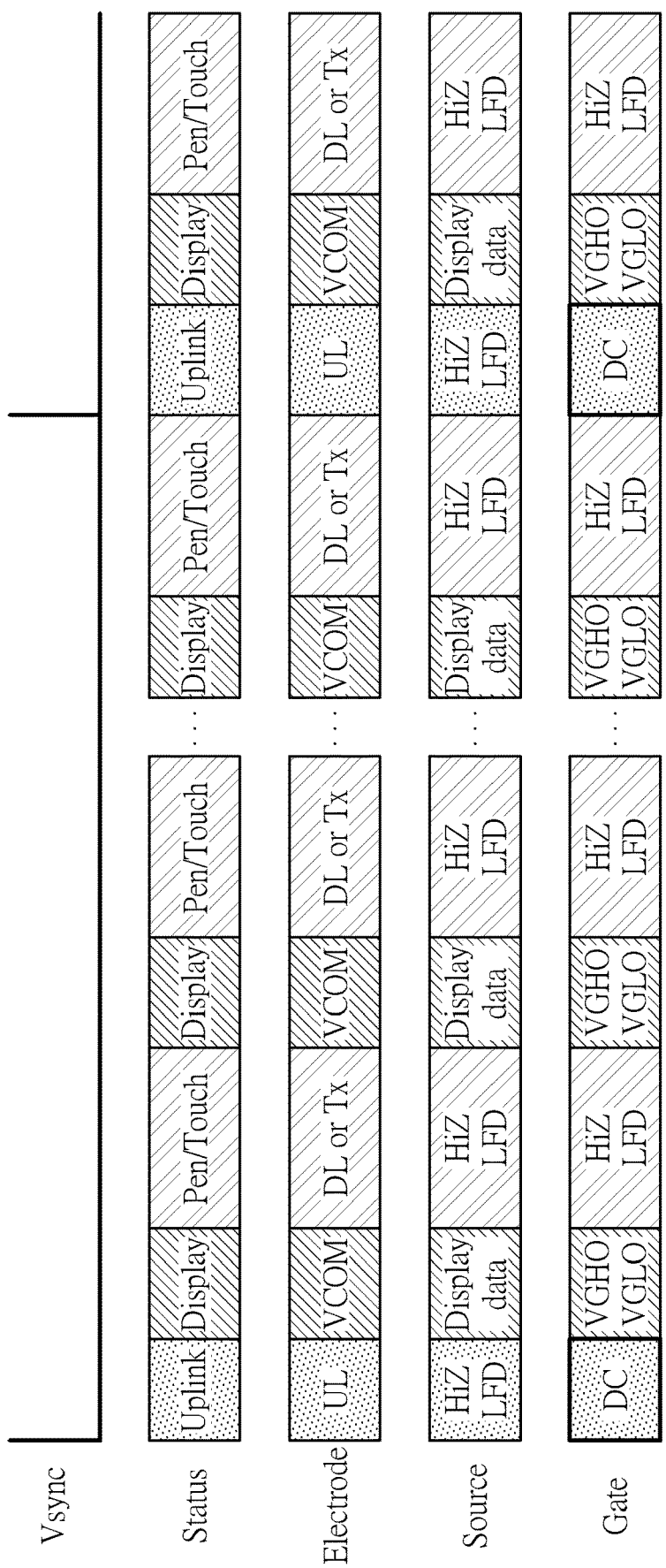
FIG. 7 is a timing diagram of controlling the active pen according to an embodiment of the present invention.

As mentioned above, the present invention provides several methods to reduce the possibility of wrongly turning on the driving transistor, so as to avoid abnormal illumination in the uplink control period where the uplink control signal UL is transmitted. In the first embodiment, in the uplink control period, the LFD or floating operation applied to the gate line is replaced by a direct-current (DC) voltage, as shown in FIG. 7. Therefore, when outputting the uplink control signal UL to the sensing electrode for controlling the active pen, the control circuit 502 may also output the DC voltage to the gate line instead of applying the LFD signal or controlling the gate line to be floating.

The DC voltage output to the gate line may be in any appropriate level capable of keeping the driving transistor of the pixel in the off state, so as to avoid abnormal illumination in the uplink control period. Referring back to FIG. 4, the driving transistor may be wrongly turned on if the common electrode is pulled ground and the floating gate line is coupled high by the uplink control signal UL. Instead, the gate line receiving the DC voltage may keep the gate-to-source voltage Vgs of the driving transistor at a constant level, thereby preventing the driving transistor from being turned on.

In an exemplary embodiment, the DC voltage applied to the gate line may be the gate low voltage VGLO, where the gate low voltage VGLO is used to generate the gate control signal in the display period. In fact, the DC voltage may be any low-enough voltage that can control the driving transistor to keep off.

Figure 8:
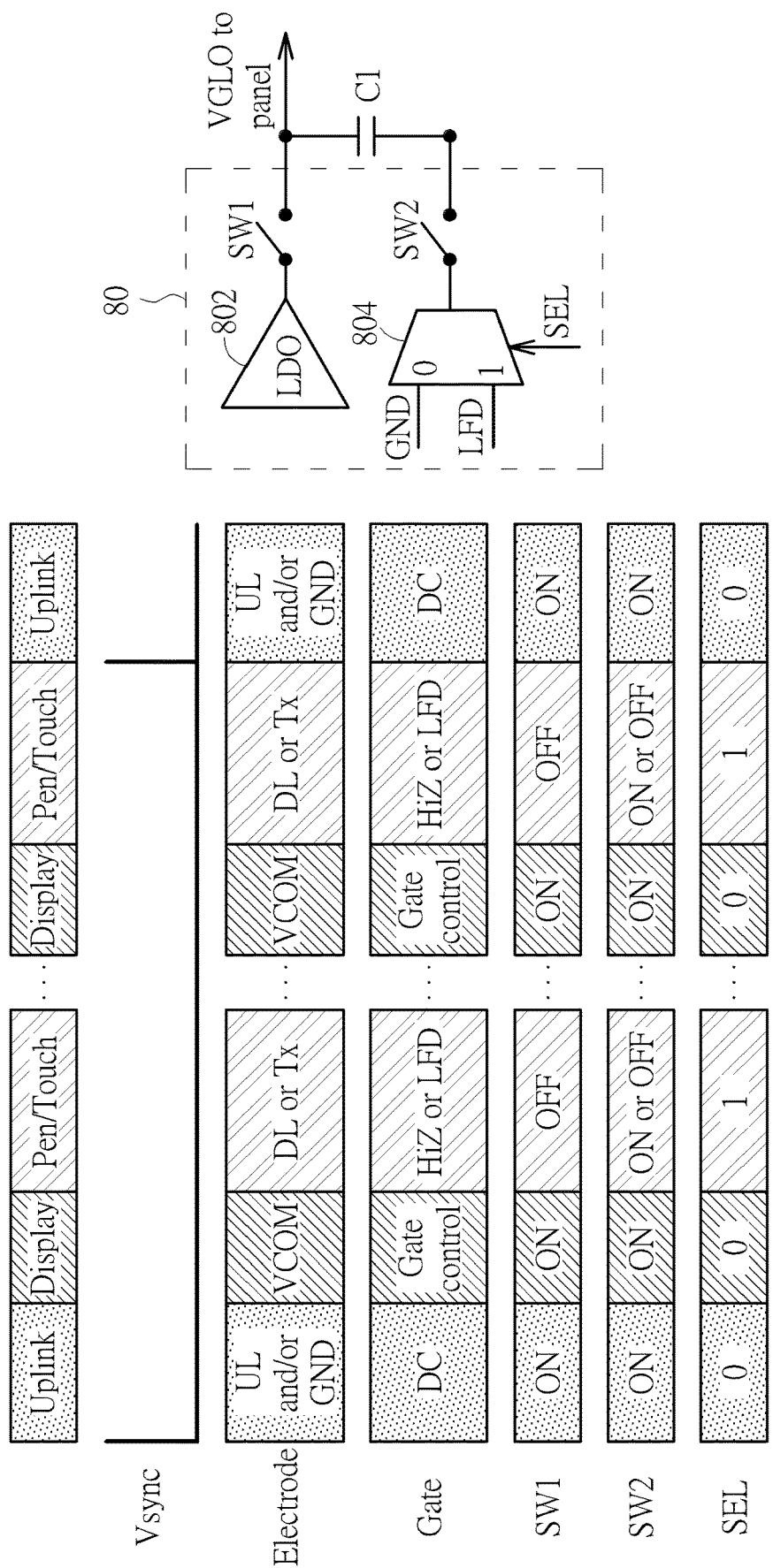
FIG. 8 is a schematic diagram of an output circuit of the control circuit used to control the gate line.

FIG. 8 is a schematic diagram of an output circuit 80 of the control circuit 502 used to control the gate line. As shown in FIG. 8, the output circuit 80, which is configured to output the gate low voltage VGLO to the touch panel 500 (e.g., to the GOA circuits of the touch panel 500), includes a voltage regulator 802, a multiplexer (MUX) 804, and switches SW1 and SW2. The voltage regulator 802 is configured to generate the gate low voltage VGLO. In a preferable embodiment, the voltage regulator 802 may be a low-dropout (LDO) regulator. The MUX 804 is configured to selectively output the ground voltage GND or the LFD signal by receiving a select signal SEL. A capacitor C1, which may be deployed in the output circuit 80, on the touch panel 500, or on a circuit board where the output circuit 80 is implemented, is coupled between the switches SW1 and SW2.

Figure 1:
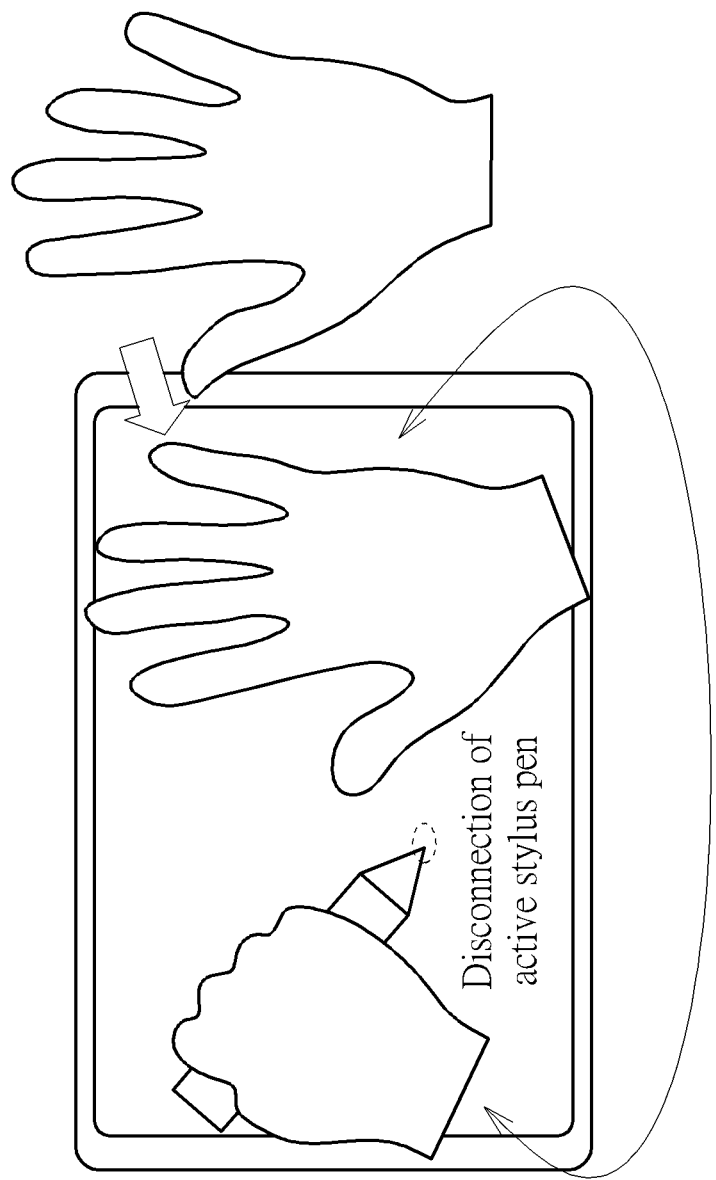
FIG. 1 illustrates that the active stylus pen is disconnected from the touch panel when the user contacts the touch panel.
Figure 2:
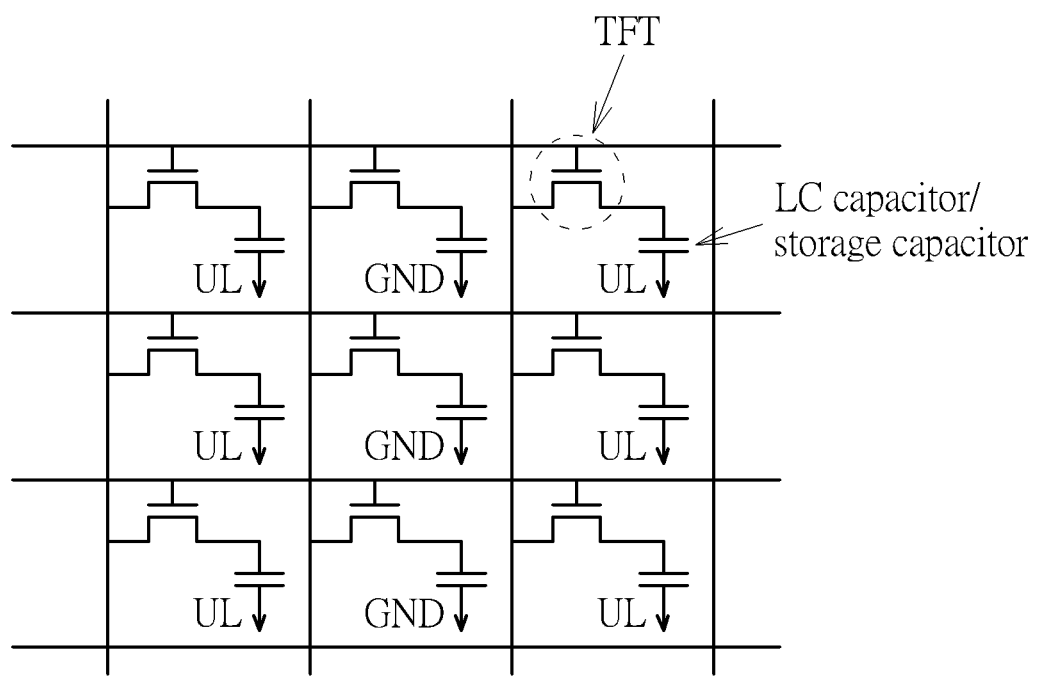
FIG. 2 is a schematic diagram of a pixel array of the touch panel.
Figure 3:
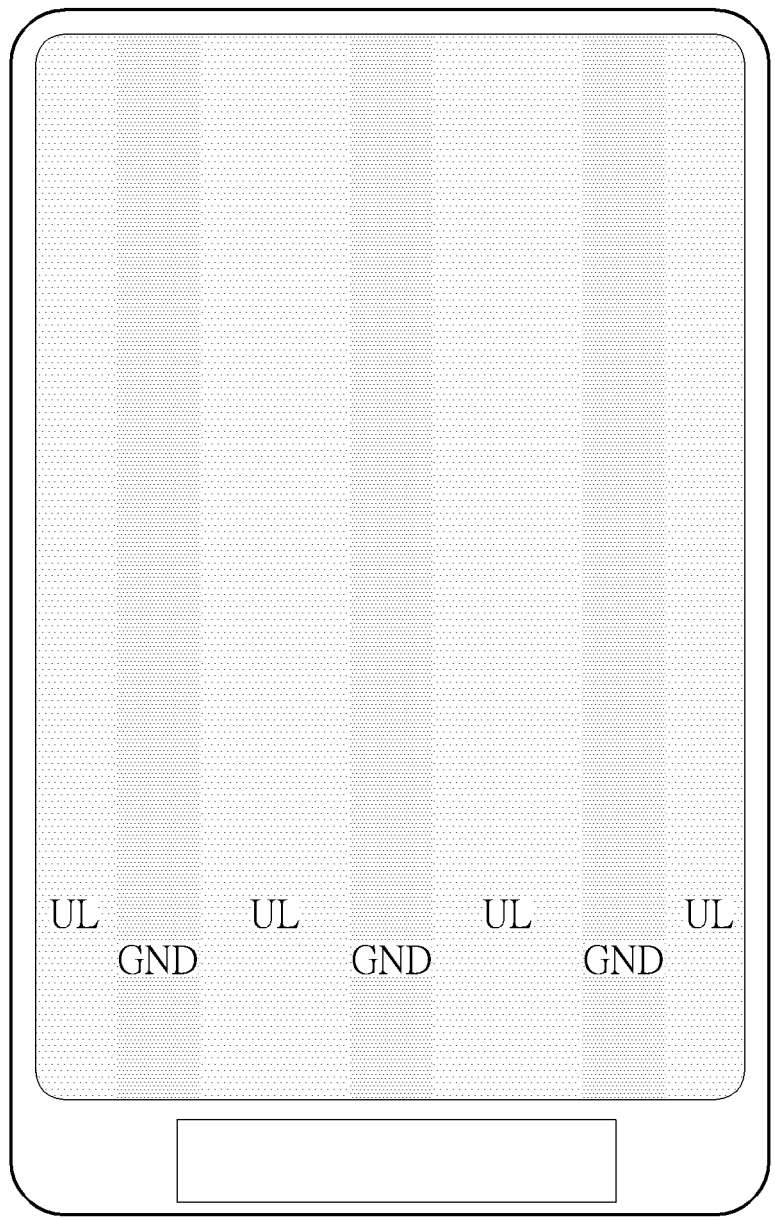
FIG. 3 illustrates the brightness difference between different regions on the panel.

In detail, during the uplink control period, the control circuit 502 may output the uplink control signal UL and/or the ground voltage GND to the sensing electrodes, where the uplink control signal UL is delivered to several sensing electrodes and the ground voltage GND is delivered to other sensing electrodes, as the implementation shown in FIG. 2. A DC voltage is applied to the gate line. In the embodiment as shown in FIG. 8, the DC voltage is the gate low voltage VGLO. Therefore, the switches SW1 and SW2 are turned on, and the MUX 804 outputs the ground voltage GND based on the select signal SEL, so that the output circuit 80 may output the constant gate low voltage VGLO to the GOA circuit, allowing the GOA circuit to output the DC voltage to the gate line.

During the display period, the sensing electrode receives the common voltage VCOM, and the gate line receives the gate control signal. Therefore, the output circuit 80 needs to provide the gate low voltage VGLO to the GOA circuit. In such a situation, the switches SW1 and SW2 are still turned on, and the MUX 804 outputs the ground voltage GND based on control of the select signal SEL, allowing the output circuit 80 to output the gate low voltage VGLO. Note that the gate control signal is switched between the gate high voltage VGHO and the gate low voltage VGLO, where the gate low voltage VGLO is output by the output circuit 80, and the control circuit 502 may include another voltage regulator used for generating and outputting the gate high voltage VGHO.

During the pen/touch sensing period, the sensing electrode may receive a downlink sensing signal DL or a touch sensing signal Tx. The gate line may receive the LFD signal or may be controlled to be floating (i.e., HiZ), in order to reduce the capacitive loads of the touch sensing operations. The LFD signal and the floating control may be performed by the output circuit 80. If the LFD signal is applied, the switch SW1 is turned off and the switch SW2 is turned on, and the MUX 804 outputs the LFD signal based on the control of the select signal SEL. The LFD signal may be coupled to the output terminal of the output circuit 80 through the capacitor C1, to be output to the gate line. If the floating is applied, the switch SW1 is turned off and the switch SW2 is turned off, and thus the output terminal of the output circuit 80 becomes floating, which thereby controls the gate line to be floating.

Figure 9:
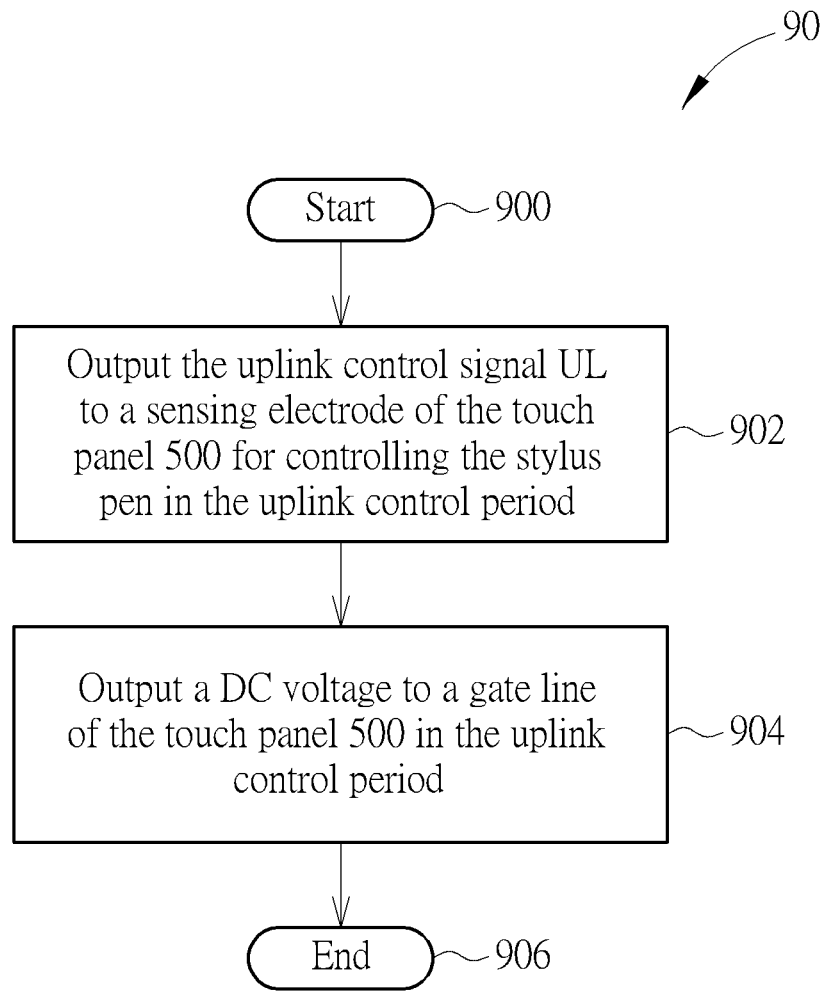
FIG. 9 is a flowchart of a process according to an embodiment of the present invention.

The abovementioned operations of the control circuit 502 may be summarized into a process 90, as shown in FIG. 9. The process 90 includes the following steps:

Step 900: Start.

Step 902: Output the uplink control signal UL to a sensing electrode of the touch panel 500 for controlling the stylus pen in the uplink control period.

Step 904: Output a DC voltage to a gate line of the touch panel 500 in the uplink control period.

Step 906: End.

Figure 10A:
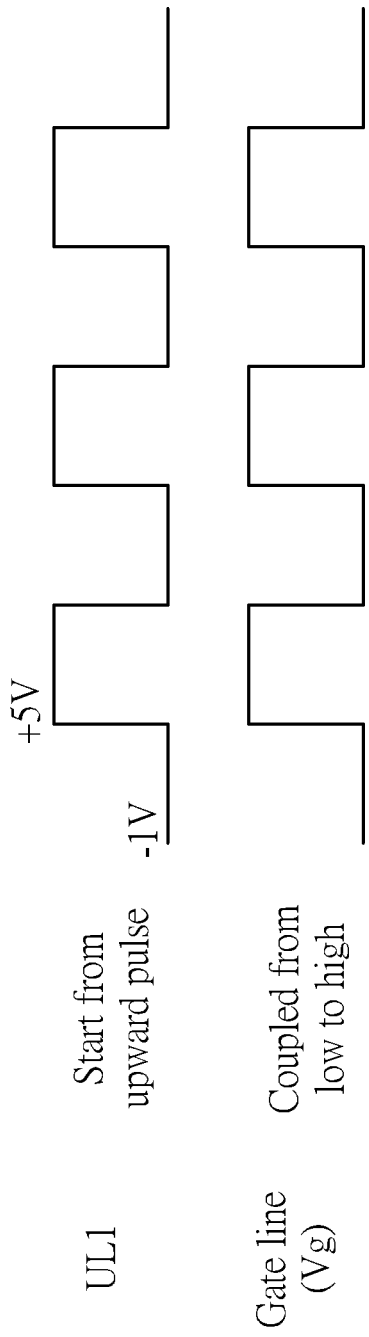
FIG. 10A is a waveform diagram of a general uplink control signal and the signal coupled to the gate line.

In the second embodiment, the uplink control signal UL to be output to the sensing electrode by the control circuit 502 may be configured to start from a downward pulse having a decreased voltage. FIG. 10A is a waveform diagram of a general uplink control signal UL1 and the signal coupled to the gate line. The uplink control signal UL1 is transmitted to a sensing electrode in the uplink control period. As shown in FIG. 10A, the general uplink control signal UL1 starts from an upward pulse. In general, when the timing enters the uplink control period, the sensing electrode may be in the common voltage VCOM, which may be equal to −1V. The pulses of the uplink control signal UL1 rise from −1V to +5V. The rising pulses may be coupled to the gate line to increase the voltage of the gate line (and also the gate voltage Vg of the driving transistor) if it is floating, thereby increasing the possibility that the driving transistor in the pixel is wrongly turned on to generate abnormal illumination.

Figure 10B:
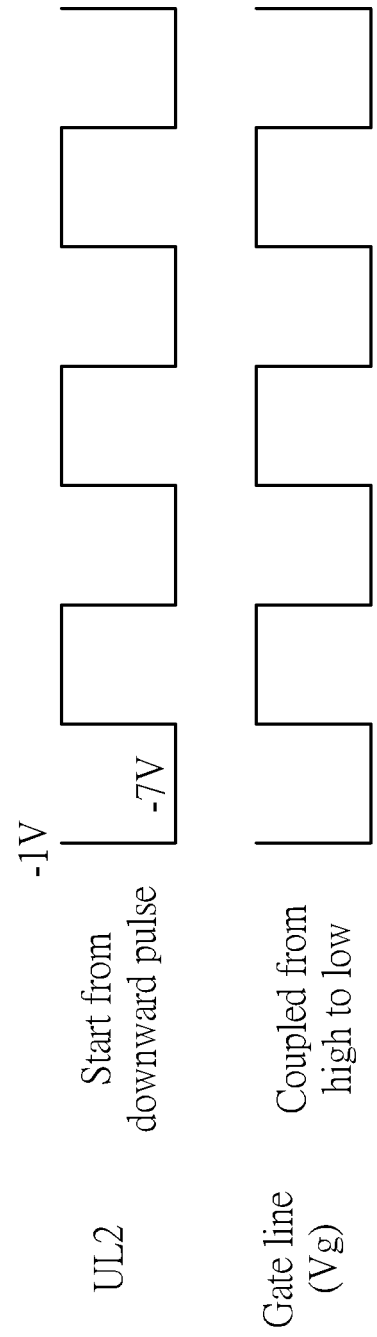
FIG. 10B is a waveform diagram of a novel uplink control signal and the signal coupled to the gate line according to an embodiment of the present invention.

FIG. 10B is a waveform diagram of a novel uplink control signal UL2 and the signal coupled to the gate line according to an embodiment of the present invention. As shown in FIG. 10B, the novel uplink control signal UL2 starts from a downward pulse. That is, when the timing enters the uplink control period, the sensing electrode may be in the common voltage VCOM, which may be equal to −1V. The control circuit 502 may output the uplink control signal UL2 having a downward pulse falling from −1V to −7V. This falling pulse may be coupled to the gate line to decrease the voltage of the gate line if it is floating. In such a situation, the gate voltage Vg may be pulled to an even low level, and thus the gate-to-source voltage Vgs of the driving transistor may be farther from a turned-on level; hence, the driving transistor will not be wrongly turned on.

Figure 11:
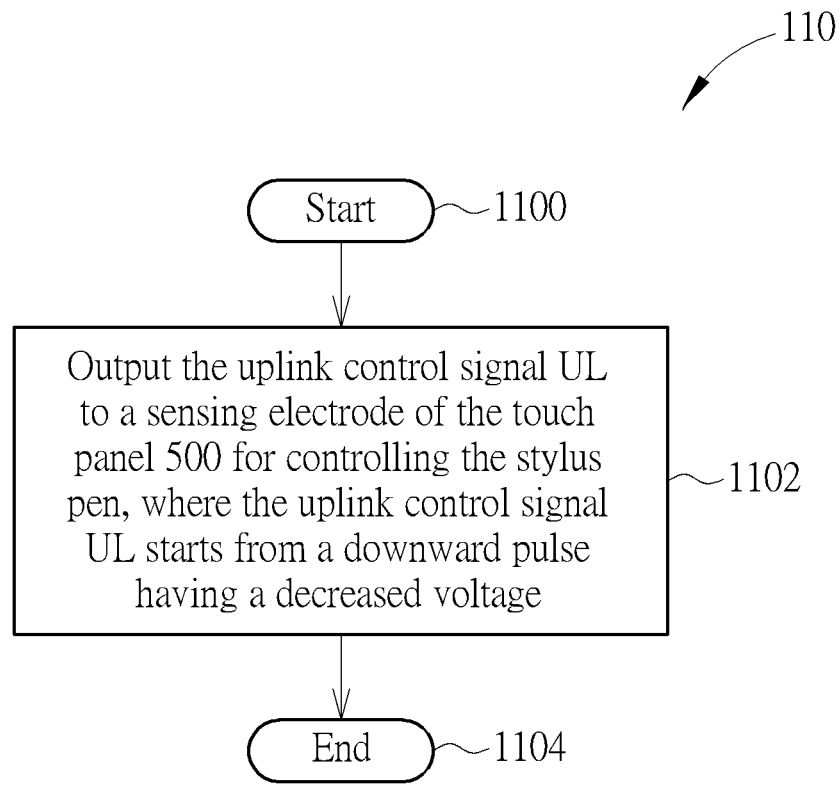
FIG. 11 is a flowchart of a process according to an embodiment of the present invention.

The abovementioned operations of the control circuit 502 may be summarized into a process 110, as shown in FIG. 11. The process 110 includes the following steps:

Step 1100:Start.

Step 1102:Output the uplink control signal UL to a sensing electrode of the touch panel 500 for controlling the stylus pen, where the uplink control signal UL starts from a downward pulse having a decreased voltage.

Step 1104:End.

In the third embodiment, the sensing electrode may be pulled to a higher level, which thereby increases the source voltage Vs of the driving transistor, so as to reduce the gate-to-source voltage Vgs of the driving transistor.

In general, before the uplink control period starts, the sensing electrodes may be in the level of the common voltage VCOM. When the timing enters the uplink control period, the sensing electrodes in the level of the common voltage VCOM (e.g., −1V) may be pulled to the ground voltage GND. Several sensing electrodes may keep in the ground voltage GND, as shown in FIG. 12A, while other sensing electrodes receive the uplink control signal UL. Note that the common electrode of the pixel serves as a sensing electrode to perform pen and touch sensing. As mentioned above, as for the driving transistor in a pixel coupled to the sensing electrode pulled to the ground voltage GND, the source voltage Vs remains unchanged while the gate voltage Vg rises due to the coupling of the uplink control signal UL, such that the gate-to-source voltage Vgs may rise and the driving transistor may be wrongly turned on to illuminate abnormally in the uplink control period.

FIG. 12B is a schematic diagram of a pixel where the electrode receives a voltage greater than the ground voltage GND according to an embodiment of the present invention. When the uplink control signal UL is transmitted to other sensing electrodes in the uplink control period, a voltage greater than the ground voltage is output to a specific sensing electrode. In such a situation, the gate-to-source voltage Vgs of the driving transistor may be reduced, and thus the possibility of wrongly turning on the driving transistor may be decreased.

The voltage output to the common electrode (i.e., the sensing electrode) may be controlled by a voltage regulator of the control circuit 502. In an embodiment, the voltage regulator is configured to output the common voltage VCOM in the display period and output a positive voltage greater than the ground voltage GND in the uplink control period.

In the example as shown in FIG. 12A, when the voltage of the common electrode rises from the common voltage VCOM to the ground voltage GND, the rising pulse may be coupled to the source terminal of the driving transistor, to generate a rising level ΔV on the source terminal. In comparison, in the embodiment as shown in FIG. 12B, the voltage of the common electrode rises from the common voltage VCOM to a positive voltage greater than the ground voltage GND with an offset ΔVos. Therefore, the source terminal of the driving transistor may be coupled high with a rising level ΔV+ΔVos. Even if the gate voltage Vg of the driving transistor may still be coupled high by the uplink control signal UL, the increasing rising coupling from the common voltage VCOM may increase the source voltage Vs of the driving transistor, so as to reduce the gate-to-source voltage Vgs of the driving transistor, thereby decreasing the possibility that the driving transistor is wrongly turned on to generate abnormal illumination.

In an exemplary embodiment, all sensing electrodes (i.e., the common electrodes of all pixels on the touch panel) may rise to a first voltage at the start of the uplink control period, where the first voltage may be any appropriate positive voltage greater than the ground voltage GND. Those sensing electrodes configured to receive a constant voltage may stay in the first voltage during the uplink control period. Those sensing electrodes configured to receive the uplink control signal UL may also rise to the first voltage at the start of the uplink control period, and the uplink control signal UL may start from the level of the first voltage. In other words, the uplink control signal UL may toggle on a higher level. In such a situation, the source voltage Vs of the driving transistor in each pixel may be coupled to a higher level.

Figure 13:
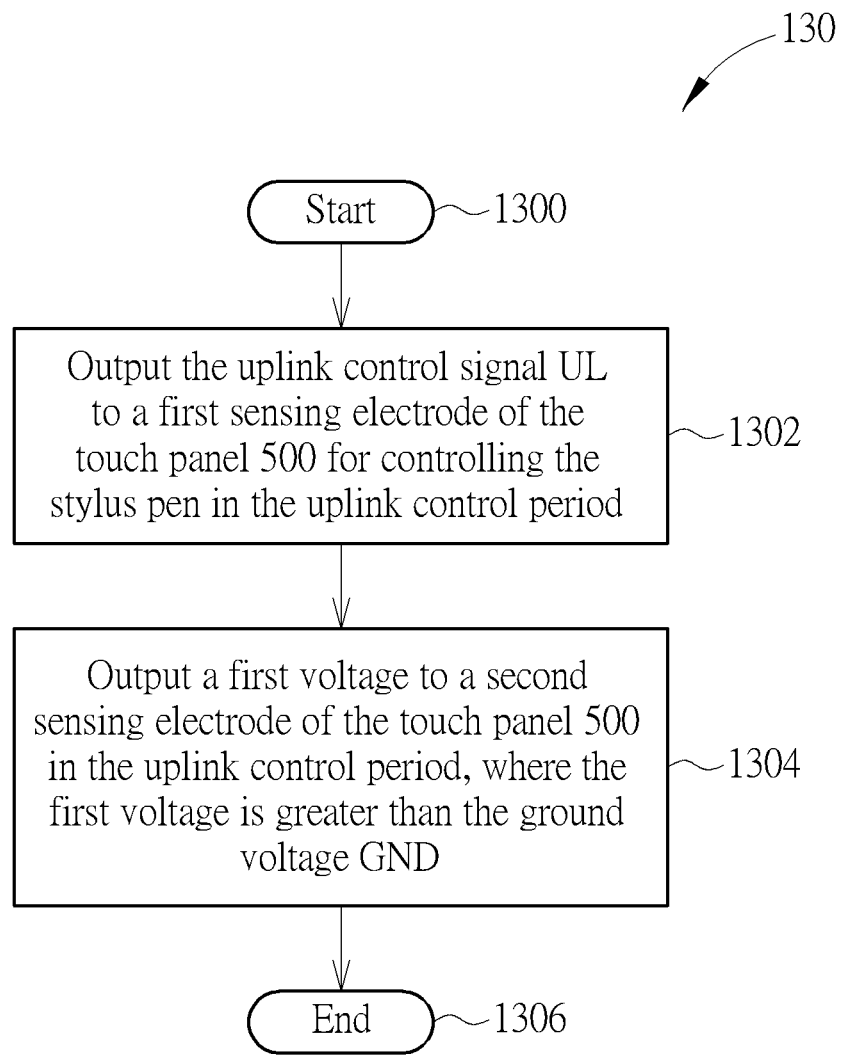
FIG. 13 is a flowchart of a process according to an embodiment of the present invention.

The abovementioned operations of the control circuit 502 may be summarized into a process 130, as shown in FIG. 13. The process 130 includes the following steps:

Step 1300:Start.

Step 1302:Output the uplink control signal UL to a first sensing electrode of the touch panel 500 for controlling the stylus pen in the uplink control period.

Step 1304:Output a first voltage to a second sensing electrode of the touch panel 500 in the uplink control period, where the first voltage is greater than the ground voltage GND.

Step 1306:End.

Note that the touch panel 500 is configured to have a first region of sensing electrodes forwarding the uplink control signal UL in the uplink control period, and also have a second region of sensing electrodes coupled to the first voltage greater than the ground voltage GND in the uplink control period to reduce the coupling effect on the pen case and achieve the purpose of improving the signal transmission efficiency. In the process 130, the first sensing electrode is in the first region that forwards the uplink control signal UL to the stylus pen, and the second sensing electrode is in the second region that receives the first voltage greater than the ground voltage GND.

In the above embodiment, the source voltage Vs of the driving transistor is coupled to a higher level through the sensing electrode. In another embodiment, in order to prevent the driving transistor from being wrongly turned on, the level of the gate voltage Vg may be decreased to a lower level. More specifically, during the uplink control period where the uplink control signal UL is transmitted, the gate low voltage VGLO may be configured to a level lower than its default level. The default level is a level used for turning off the driving transistor of the pixel during the display period or the pen/touch sensing period in a general touch panel. Note that the general touch panel is configured with a gate high voltage VGHO and a gate low voltage VGLO, where the default level of the gate high voltage VGHO output to the gate line may turn on the driving transistor and the default level of the gate low voltage VGLO output to the gate line may turn off the driving transistor.

FIG. 14A is a waveform diagram of an uplink control signal UL and the voltage coupled or applied to the gate line. Similar to the example shown in FIG. 10A, the voltage on the gate line and the gate voltage Vg of the driving transistor are coupled high by the uplink control signal UL, which may include a series of pulses rising from −1V to 5V. In this example, at the start of the uplink control period, the gate line may be pulled to the default level of the gate low voltage VGLO and then controlled to be floating or applied with the LFD signal. Alternatively, the gate line may be pulled to the default level of the gate low voltage VGLO at the end of a display period previous to the uplink control period, and then controlled to be floating or applied with the LFD signal when the timing enters the subsequent pen/touch sensing period or the uplink control period. Therefore, in the uplink control period, the voltage of the gate line (or the gate voltage Vg of the driving transistor) may be coupled high or pulled high from the default level of the gate low voltage VGLO.

FIG. 14B is a waveform diagram of an uplink control signal UL and the voltage coupled or applied to the gate line according to an embodiment of the present invention. In this embodiment, the gate low voltage VGLO is configured to be in a specific level lower than its default level when the timing enters the uplink control period. Therefore, when the gate line is coupled high or pulled high in the uplink control period, it starts from the specific level. In such a situation, the gate voltage Vg, even being coupled high by the uplink control signal UL1 or pulled high by the LFD signal, may still be in a quite low level, so that the gate-to-source voltage Vgs of the driving transistor may be farther from the turned-on level, which will not easily turn on the driving transistor to general abnormal illumination.

Figure 15:
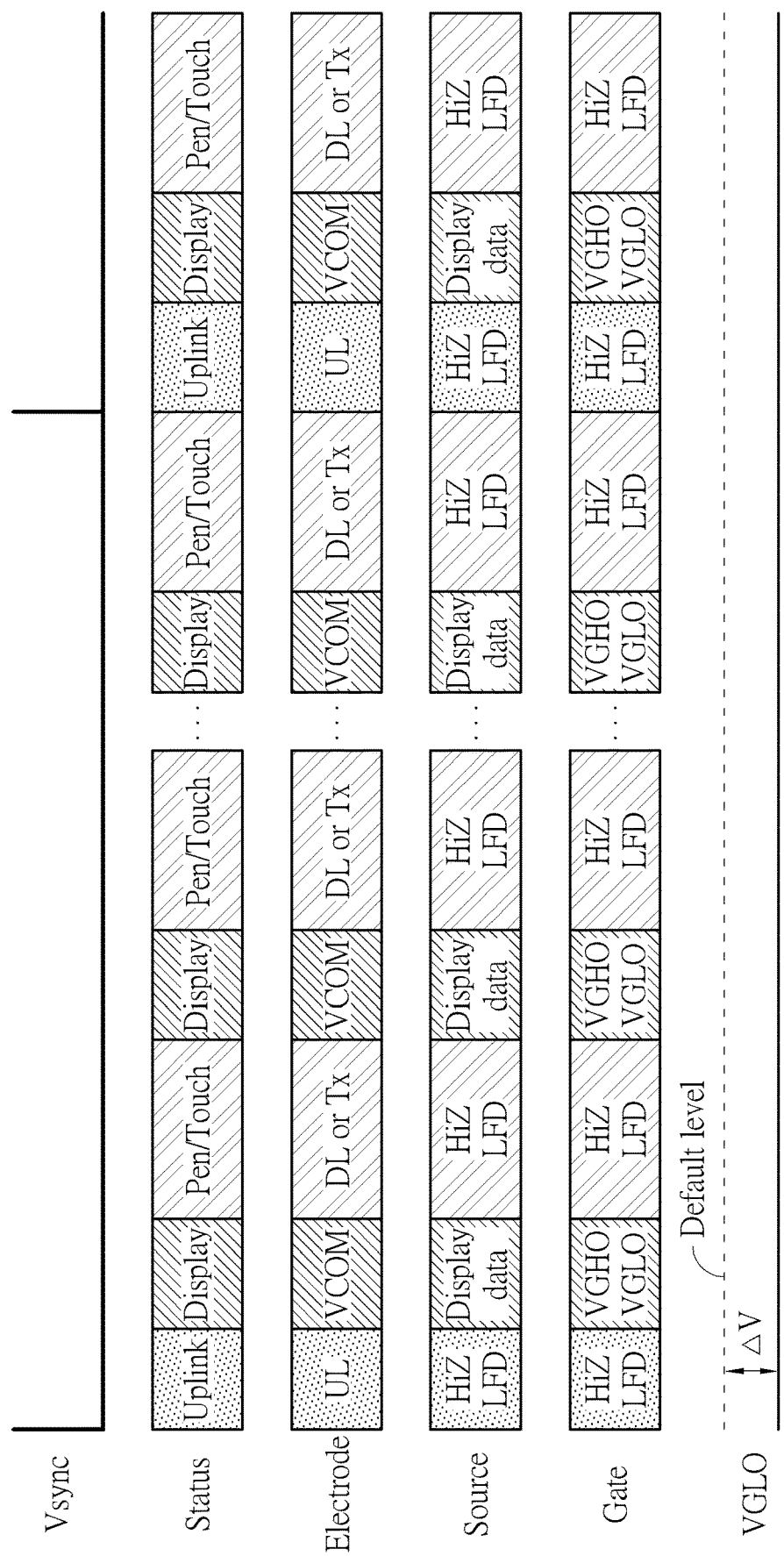
FIG. 15 illustrates that the gate low voltage is configured to be in a lower level throughout the frame period.

In an embodiment, the gate low voltage VGLO is configured to be always in the specific level lower than its default level. More specifically, during the uplink control period, the display period and the pen/touch sensing period, the gate low voltage VGLO may be configured to the same voltage level lower than the default level. For example, as shown in FIG. 15, the gate low voltage VGLO is configured to be in a lower level (with a decrease of ΔV) throughout a frame period.

Figure 16:
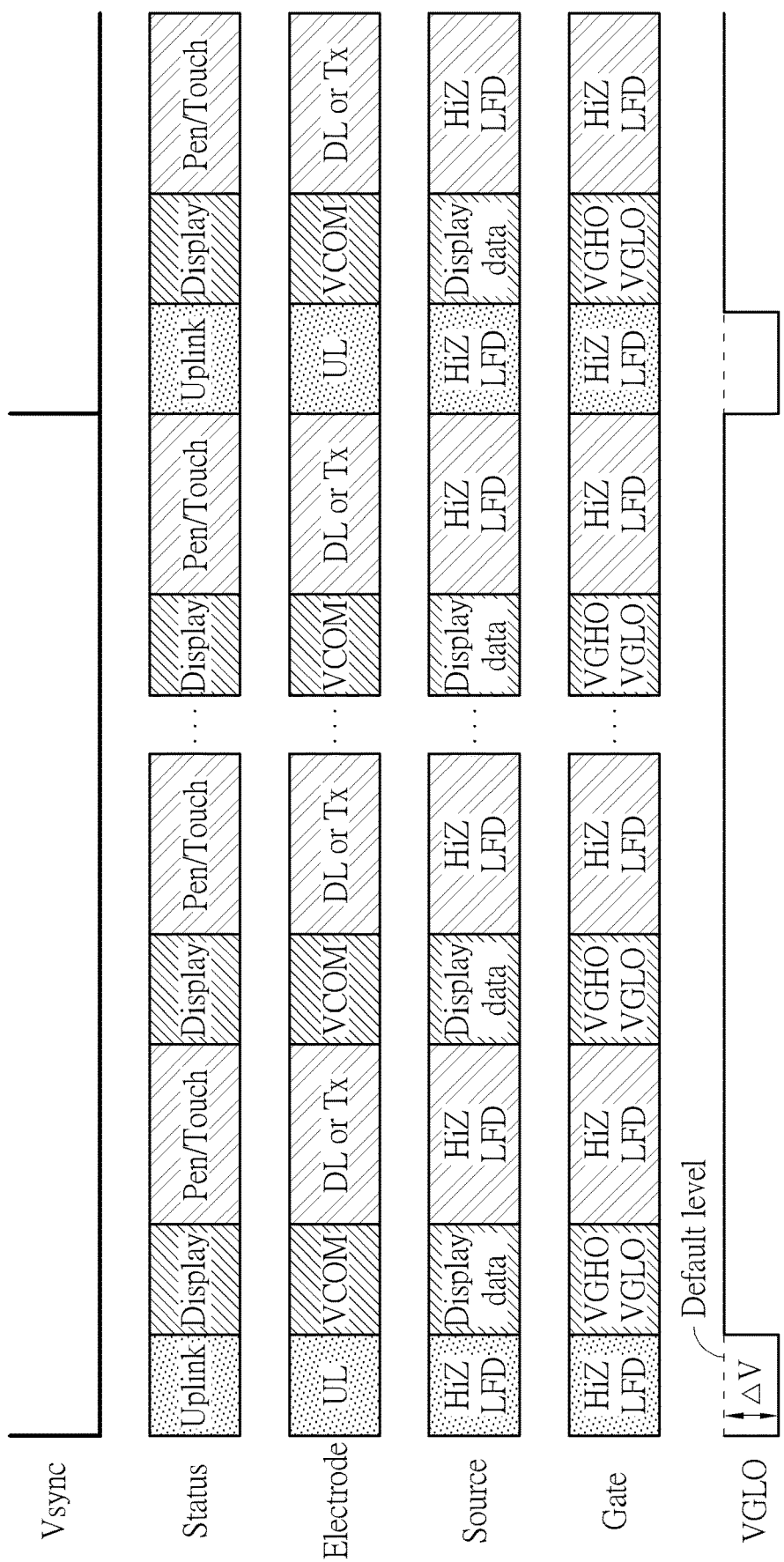
FIG. 16 illustrates that the gate low voltage is configured to be in a lower level during the uplink control period.

In another embodiment, the gate low voltage VGLO is configured to be in the specific level lower than its default level only in the uplink control period. For example, as shown in FIG. 16, the gate low voltage VGLO is configured to be in a lower level (with a decrease of ΔV) during the uplink control period. During the display period and the pen/touch sensing period, the gate low voltage VGLO may be returned to its default level. In such a situation, the effect of reducing the possibility of wrongly turning on the driving transistor in the uplink control period may still be achieved.

The above implementation of the gate low voltage VGLO may be realized by using a voltage regulator of the control circuit 502. For example, referring back to FIG. 8, the voltage regulator 802 is applied to generate the gate low voltage VGLO. If the gate low voltage VGLO is configured with a default level and a lower level to be output selectively, the voltage regulator 802 may further be implemented to have a selection scheme to change its output level. For example, the control circuit 502 may generate a control signal to control the voltage regulator 802, in order to output the gate low voltage VGLO in the lower level during the uplink control period and output the gate low voltage VGLO in the default level during other periods.

Figure 17:
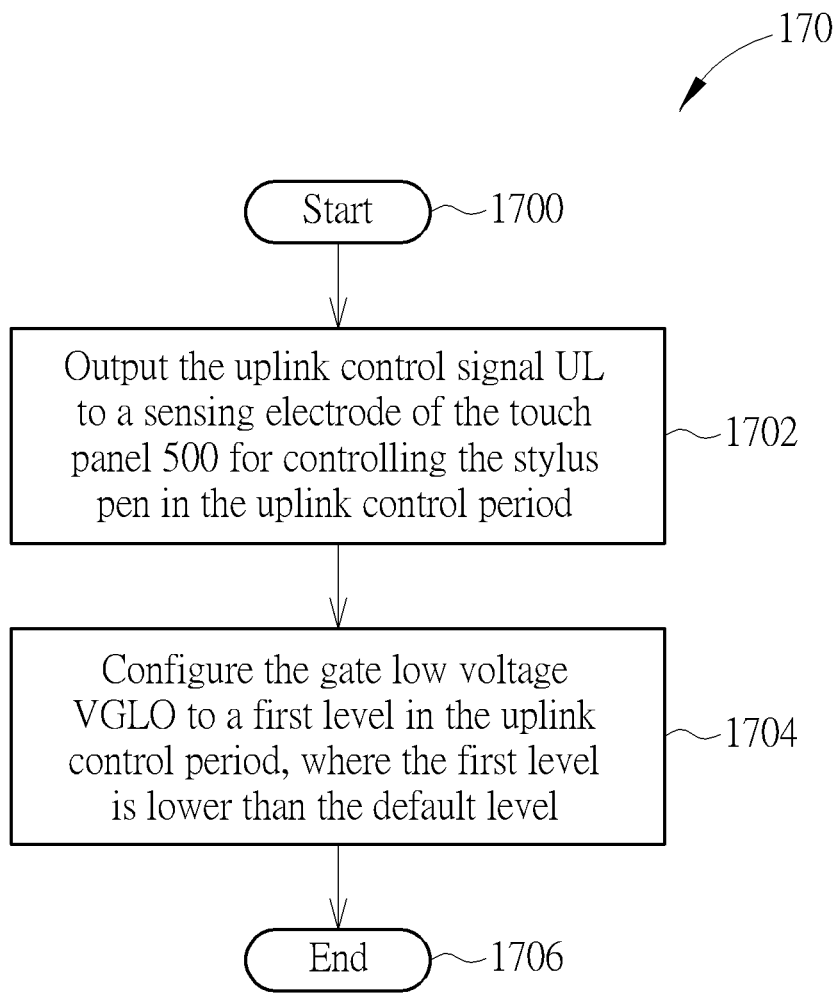
FIG. 17 is a flowchart of a process according to an embodiment of the present invention.

The abovementioned operations of the control circuit 502 may be summarized into a process 170, as shown in FIG. 17. The process 170 includes the following steps:

Step 1700:Start.

Step 1702:Output the uplink control signal UL to a sensing electrode of the touch panel 500 for controlling the stylus pen in the uplink control period.

Step 1704:Configure the gate low voltage VGLO to a first level in the uplink control period, where the first level is lower than the default level.

Step 1706:End.

Please note that the present invention aims at providing a method of controlling the active pen and the touch panel to reduce the possibility of wrongly turning on the driving transistor in the uplink control period. Those skilled in the art may make modifications and alterations accordingly. For example, the present invention provides various methods to make the gate voltage Vg of the driving transistor as low as possible and/or make the source voltage Vs of the driving transistor as high as possible in the uplink control period, thereby reducing the gate-to-source voltage Vgs. Therefore, any two or more of the abovementioned embodiments may be combined to enhance the performance. For example, in an embodiment, the gate low voltage VGLO may be configured to be in a specific level lower than its default level, and the gate line may be pulled to the specific level at the start of the uplink control period and then kept constant by receiving a DC voltage during the uplink control period. In such a situation, the gate voltage Vg may remain in an extremely low level without being coupled high, which further minimizes the possibility of wrongly turning on the driving transistor.

Further, under the lower level of the gate low voltage VGLO, the gate line may be controlled to be floating or applied with an LFD signal during the uplink control period where the uplink control signal is output. Alternatively and additionally, the source voltage Vs may be increased by applying a DC voltage having a level greater than the ground voltage to the sensing electrode. A series of downward pulses may also be applied to generate the uplink control signal to generate downward coupling on the gate line. Those implementations and operations provided in the present disclosure may be selectively incorporated to reduce the possibility of wrongly turning on the driving transistor to generate abnormal illumination in the uplink control period.

More specifically, in the first embodiment, a DC voltage is applied to the gate line to prevent the gate voltage from being coupled high by the uplink control signal in the uplink control period. In the second embodiment, the uplink control signal starts from a downward pulse instead of an upward pulse, so that the gate voltage may be coupled low to a lower level in the uplink control period. In the third embodiment, the voltage of sensing electrodes in the uplink control period are pulled to a higher level, e.g., higher than the ground voltage, at the start of the uplink control period, so that the source voltage of the driving transistor is coupled to a higher level to prevent the driving transistor from being turned on. In the fourth embodiment, the gate low voltage is configured to have a lower level lower than its default level for turning off the driving transistor in display operations, and the decrease of the gate low voltage may be output to the gate line to reduce the gate voltage of the driving transistor. In another embodiment, the implementations of two or more of the above embodiments may be combined to further minimize the possibility of wrongly turning on the driving transistor, so as to enhance the performance of the uplink control for active pen.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of controlling a stylus pen of a touch panel, the touch panel being configured with a gate low voltage having a default level for turning off a driving transistor of the touch panel in a display period or a sensing period, the method comprising:
    outputting an uplink control signal to a sensing electrode of the touch panel for controlling the stylus pen in an uplink control period; and
    configuring the gate low voltage to a first level in the uplink control period, wherein the first level is lower than the default level, and the first level is used to turn off the driving transistor; and
    wherein the gate low voltage is used to generate a gate control signal to be output to a gate line of the touch panel in the uplink control period.

2. The method of claim 1, further comprising performing at least one of the following steps in the uplink control period:
    outputting the gate low voltage in the first level as a direct-current (DC) voltage to the gate line of the touch panel;
    applying a load-free driving signal to the gate line when the gate low voltage is in the first level; and
    controlling the gate line to be floating when the gate line is in the first level.

* * * * *